(12) United States Patent
Tai et al.

(10) Patent No.: US 10,209,410 B2
(45) Date of Patent: Feb. 19, 2019

(54) PRISM SHEET, AND A BACKLIGHT MODULE AND A DISPLAY APPARATUS INCLUDING THE SAME

(71) Applicants: RADIANT OPTO-ELECTRONICS (SUZHOU) CO., LTD, Wujiang, Jiangsu Province (CN); RADIANT OPTO-ELECTRONICS CORPORATION, Kaohsiung (TW)

(72) Inventors: Yung Hui Tai, Kaohsiung (TW); Wei Hsuan Chen, Kaohsiung (TW)

(73) Assignees: RADIANT OPTO-ELECTRONICS (SUZHOU) CO., LTD., Wujiang (CN); RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 15/671,818

(22) Filed: Aug. 8, 2017

(65) Prior Publication Data
US 2017/0336542 A1    Nov. 23, 2017

Related U.S. Application Data

(63) Continuation-in-part of application No. PCT/CN2016/079644, filed on Apr. 19, 2016.

(30) Foreign Application Priority Data

Jan. 26, 2016   (CN) .......................... 2016 1 0052574

(51) Int. Cl.
*G02B 5/04*    (2006.01)
*F21V 5/02*    (2006.01)
(Continued)

(52) U.S. Cl.
CPC .................. *G02B 5/04* (2013.01); *F21V 5/02* (2013.01); *G02B 5/0215* (2013.01);
(Continued)

(58) Field of Classification Search
CPC ...... G02B 5/04; G02B 5/0263; G02B 5/0231; G02B 5/0215; G02B 6/0043; G02B 6/0061; G02B 6/0053; G02F 1/1335; F21V 5/02
See application file for complete search history.

(56) References Cited

U.S. PATENT DOCUMENTS

| 7,529,461 | B1 | 5/2009 | Chen et al. |
| 2004/0125588 | A1 | 7/2004 | Ho |

(Continued)

FOREIGN PATENT DOCUMENTS

| CN | 1396483 A | 2/2003 |
| CN | 2800320 Y | 7/2006 |

(Continued)

OTHER PUBLICATIONS

Search Report issued to PCT application No. PCT/CN2016/079644 by the SIPO dated Oct. 25, 2016, with an English translation of the sections boxed in red.
(Continued)

*Primary Examiner* — David V Bruce
(74) *Attorney, Agent, or Firm* — Perkins Coie LLP

(57) ABSTRACT

A prism sheet includes a sheet body that includes opposite light exiting and incident surfaces, and a lateral side transversely connected between the light incident and exiting surfaces. The light exiting surface includes two side regions disposed on two opposite sides of a reference line on the light exiting surface, which is perpendicular to the lateral side. The sheet body further includes a plurality of parallel microstructure members protruding from the light exiting surface and extending perpendicularly to the lateral side. The microstructure members have a distribution density (Continued)

decreased in a density-decreasing direction parallel to the lateral side and pointing toward either of the side regions from the reference line.

19 Claims, 12 Drawing Sheets

(51) Int. Cl.
    *G02F 1/1335* (2006.01)
    *F21V 8/00* (2006.01)
    *G02B 5/02* (2006.01)

(52) U.S. Cl.
    CPC ......... *G02B 5/0231* (2013.01); *G02B 5/0263* (2013.01); *G02B 6/0043* (2013.01); *G02B 6/0053* (2013.01); *G02B 6/0061* (2013.01); *G02F 1/1335* (2013.01)

(56) References Cited

U.S. PATENT DOCUMENTS

| | | | |
|---|---|---|---|
| 2006/0104093 A1 | 5/2006 | Di Geng et al. | |
| 2007/0127268 A1 | 6/2007 | Chen | |
| 2018/0106950 A1* | 4/2018 | Kuo | ................. G02B 6/0053 |

FOREIGN PATENT DOCUMENTS

| | | |
|---|---|---|
| CN | 101057168 A | 10/2007 |
| CN | 101271172 A | 9/2008 |
| CN | 101641619 A | 2/2010 |
| CN | 102081186 A | 6/2011 |
| CN | 102346268 A | 2/2012 |
| CN | 102506356 A | 6/2012 |
| CN | 102809105 A | 12/2012 |
| CN | 103149611 A | 6/2013 |
| CN | 104280797 A | 1/2015 |
| CN | 205507126 U | 8/2016 |
| JP | 2010152211 A | 7/2010 |
| JP | 2010152211 A | 8/2010 |
| KR | 20080085242 A | 9/2008 |
| TW | 595723 U | 6/2004 |
| TW | 200502601 A | 1/2005 |
| TW | M330483 U | 4/2008 |
| TW | 201326983 A | 7/2013 |

OTHER PUBLICATIONS

Search Report appended to an Office Action issued to Taiwanese counterpart application No. 105103782 by the TIPO dated Feb. 18, 2017, with an English translation thereof.

* cited by examiner

PRISM SHEET, AND A BACKLIGHT MODULE AND A DISPLAY APPARATUS INCLUDING THE SAME

CROSS-REFERENCE TO RELATED APPLICATION

This application is a bypass continuation-in-part application of International Application No. PCT/CN2016/079644 filed on Apr. 19, 2016, which claims priority of Chinese Patent Application No. 201610052574.2, filed on Jan. 26, 2016.

FIELD

The disclosure relates to a prism sheet, and more particularly to a prism sheet with microstructure members having a variable distribution density, and to a backlight module and a display apparatus including the prism sheet.

BACKGROUND

Referring to FIG. 1, a conventional backlight module 1 includes a light guide plate 12 having a top surface 121 and a lateral surface 122 transversely connected to the top surface 121, a light source unit 11 disposed on the lateral surface 122 of the light guide plate 12, a first diffuser plate 13 disposed on the top surface 121 of the light guide plate 12, a first prism plate 14 disposed on the first diffuser plate 13 and opposite to the light guide plate 12, and a second diffuser plate 15 disposed on the first prism plate 14 and opposite to the first diffuser plate 13. Light emanating from the light source 11 enters the light guide plate 12 through the lateral surface 122 and exits from the second diffuser plate 15 through the light guide plate 12, the first diffuser plate 13, the first prism plate 14 and the second diffuser plate 15. The first prism plate 14 includes a plurality of first microstructure members 141 extending in a direction parallel to the lateral surface 122 of the light guide plate 12 so as to refract the light entering the first prism plate 14 to be converged in the direction perpendicular to the lateral surface 122. Thereafter, the refracted and converged light will enter and be diffused by the second diffuser plate 15 and then exit from the backlight module 1 to provide a light field with improved luminous intensity.

Referring to FIG. 2, in order to further improve the luminous uniformity of the light, the conventional backlight module 1 further includes a second prism plate 16 that is disposed between the first prism plate 14 and the second diffuser plate 15. The second prism plate 16 includes a plurality of spaced-apart second microstructure members 161 that extend in a direction perpendicular to an extending direction of the first microstructure members 141 of the first prism plate 14. However, the design of the conventional backlight module 1 advantageously improves the luminous intensity of a central portion thereof but adversely restricts the viewing angles. Hence, when the conventional backlight module 1 is applied to a display apparatus, the performance of the display apparatus is adversely affected by decreased viewing angles of the backlight module 1.

SUMMARY

Therefore, an object of the disclosure is to provide a prism sheet that can alleviate at least one of the drawbacks of the prior art.

According to one aspect of the disclosure, the prism sheet includes a sheet body including a light exiting surface, a light incident surface opposite to the light exiting surface, and a lateral side transversely connected between the light incident and exiting surfaces. The light exiting surface includes two side regions disposed on two opposite sides of a reference line on the light exiting surface, which is perpendicular to the lateral side. The sheet body further includes a plurality of parallel microstructure members protruding from the light exiting surface and extending perpendicularly to the lateral side.

The microstructure members have a distribution density which is decreased in a density-decreasing direction that is parallel to the lateral side and that points toward either of the side regions from the reference line. According to another aspect of the disclosure, a backlight module includes a light guide plate, a light source, and the abovementioned prism sheet.

The light guide plate has a first surface and a second surface transversely connected to the first surface.

The light source is mounted adjacent the first surface of the light guide plate and emanates light that enters the light guide plate through the first surface and exits from the light guide plate through the second surface.

The prism sheet is disposed on the second surface of the light guide plate with the light exiting surface facing oppositely of the second surface of the light guide plate.

According to the other aspect of the disclosure, a display apparatus includes the abovementioned backlight module and a display panel.

The backlight panel is disposed at one side of the backlight module opposite to the light guide plate.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
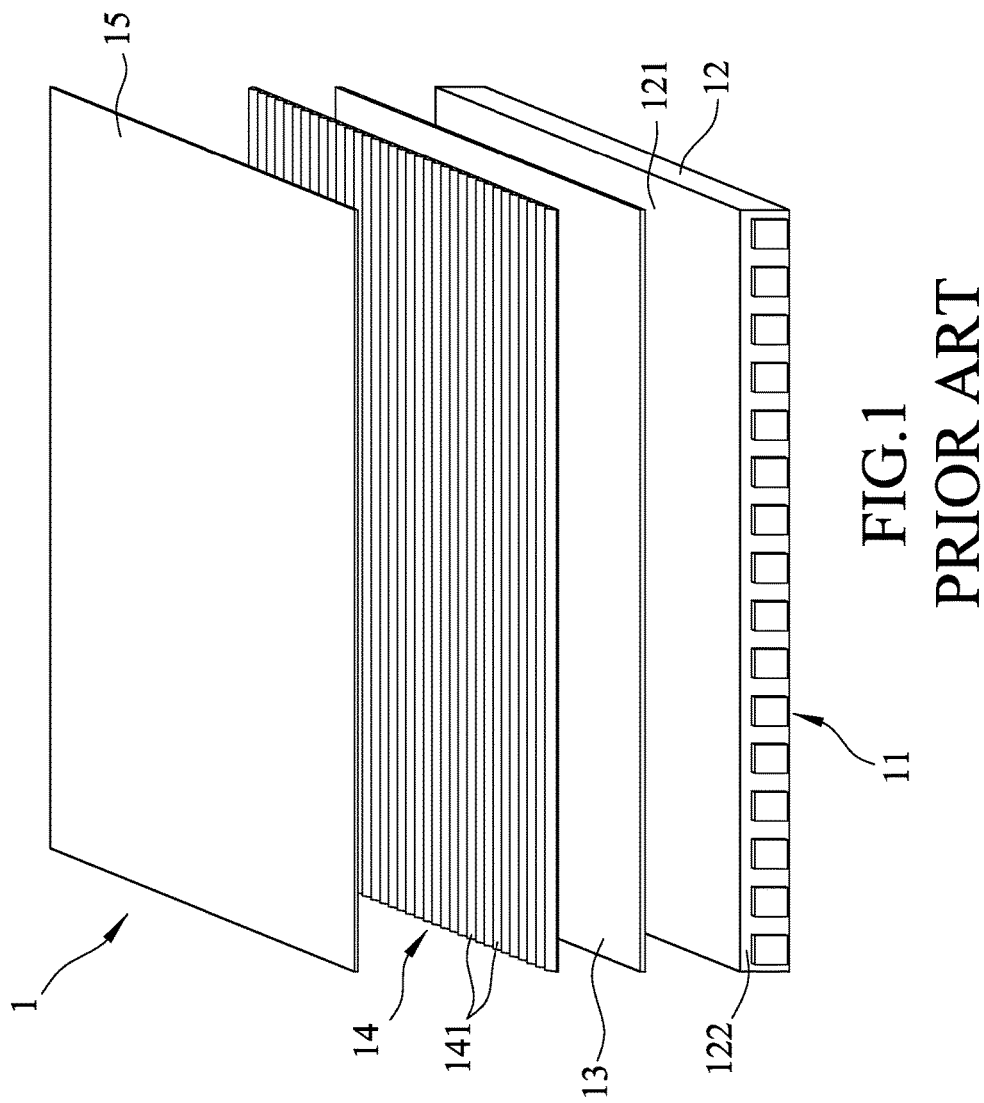
FIG. 1 is an exploded perspective view illustrating a conventional backlight module.
Figure 2:
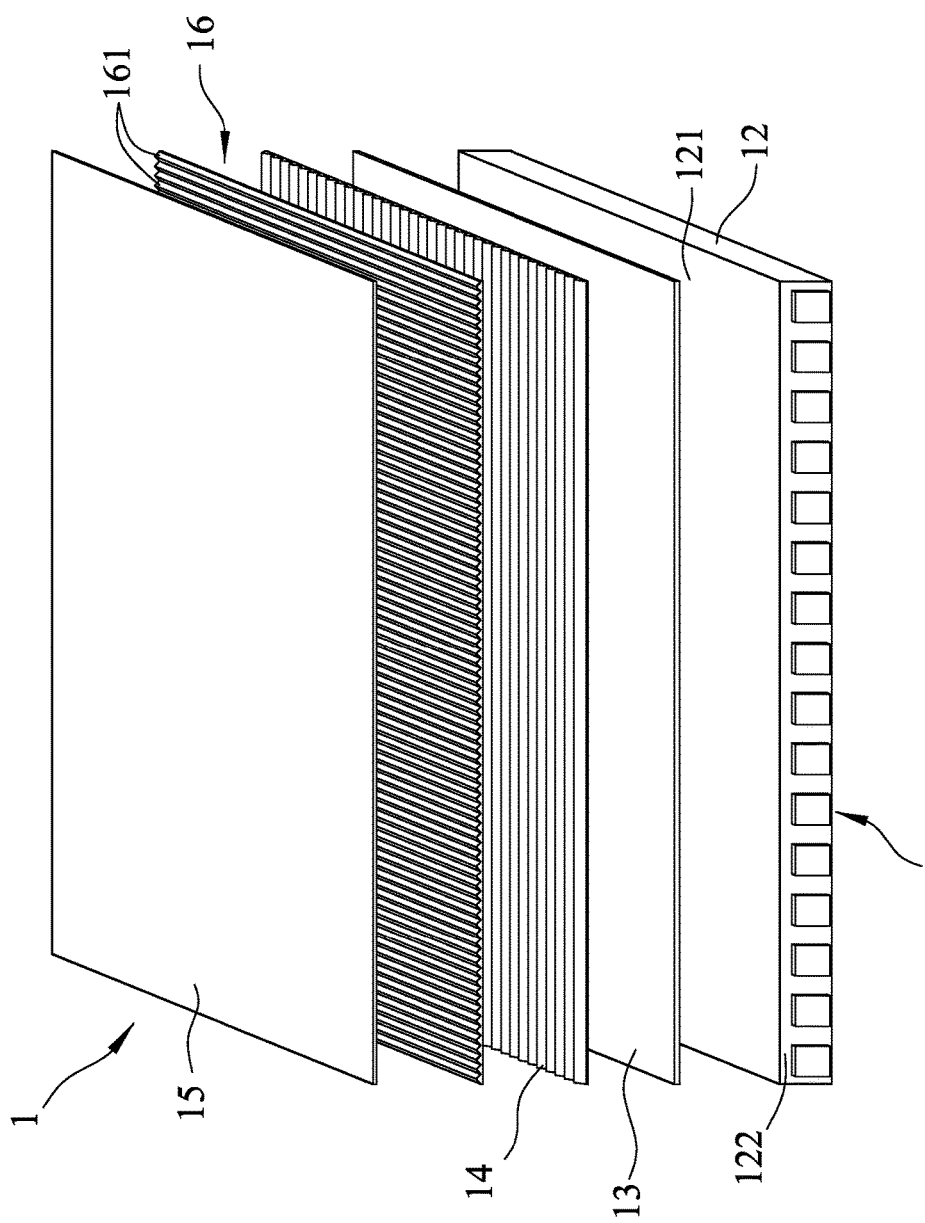
FIG. 2 is another configuration of the conventional backlight module of FIG. 1.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
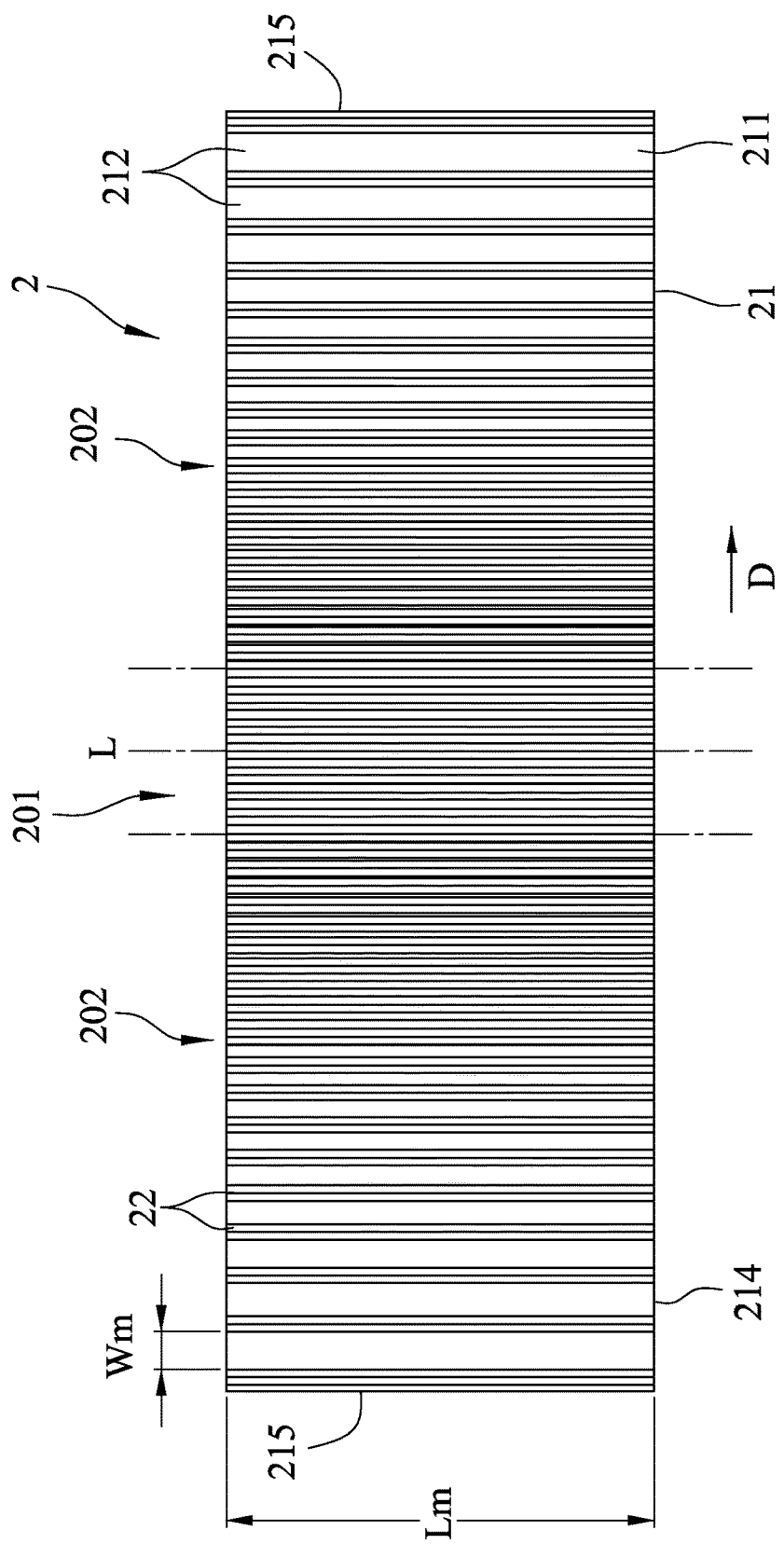
FIG. 3 is a top view illustrating an embodiment of a prism sheet according to the disclosure.
Figure 4:
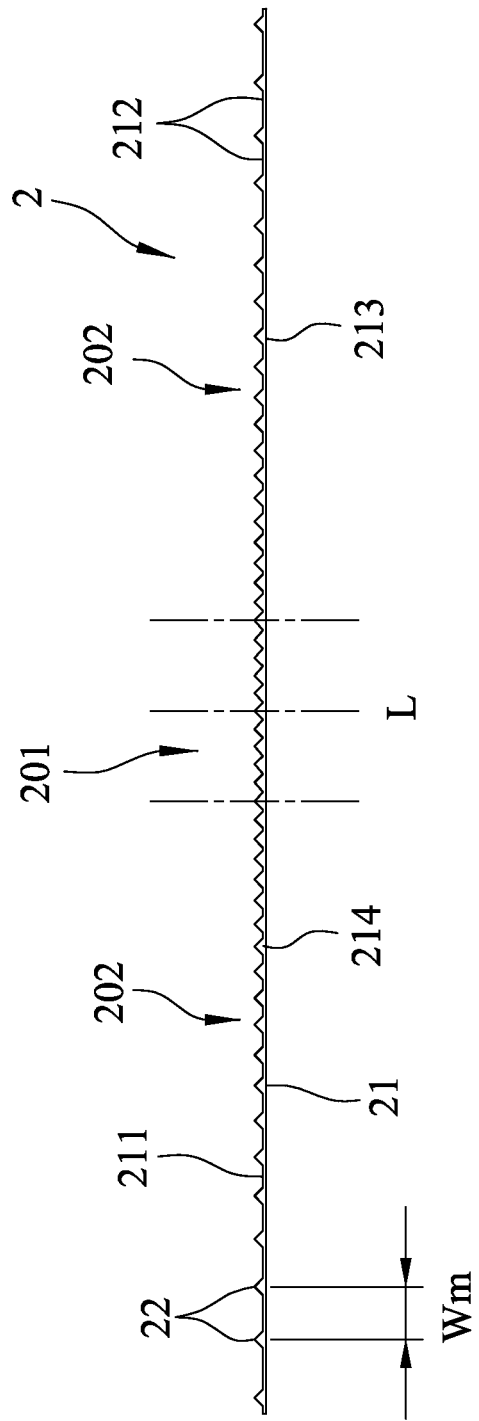
FIG. 4 is a side view illustrating the embodiment.

Referring to FIGS. 3 and 4, an embodiment of a prism sheet 2 according to the disclosure includes a sheet body 21 that includes a light exiting surface 211, a light incident surface 213 opposite to the light exiting surface 211, and a lateral side 214 transversely connected between the light incident surface 213 and the light exiting surface 211.

The light exiting surface 211 includes two sides regions 202 that are disposed on two opposite sides of a reference line (L) on the light exiting surface 211, which is perpendicular to the lateral side 214. The sheet body 21 further includes a plurality of parallel microstructure members 22 protruding from the light exiting surface 211 and extending perpendicularly to the lateral side 214. The reference line (L) can be designed to be located at any position between two sides 215 of the light exiting surface 211 according to different using situations. In most cases, like as in the embodiment, the reference line (L) is a central line of the light exiting surface 211 (as shown in FIG. 3).

The microstructure members 22 have a distribution density which is decreased in a density-decreasing direction (D) that is parallel to the lateral side 214 and that points toward either of the side regions 202 from the reference line (L). That is to say, the distribution density of the microstructure members 22 in the side region 202 is decreased in a direction away from the reference line (L).

In the embodiment, the light exiting surface 211 further includes a central region 201 that has the reference line (L) and that is interposed between the side regions 202. The distribution density of the microstructure members 22 is decreased in each of the side regions 202 from the central region 201 and along the density-decreasing direction (D). The density-decreasing direction (D) of the microstructure members 22 in each of the side regions 202 is parallel to the lateral side 214 and opposite to that of the microstructure members 22 in the other one of the side regions 202.

The distribution density of the microstructure members 22 in the central region 201 is greater than that in each the side regions 202. In one form, the microstructure members 22 are directly connected with each other in the central region 201, and the microstructure members 22 in each of the side regions 202 are spaced from each other.

More specifically, the light exiting surface 211 further includes multiple planar stripes 212. Each of the planar stripes 212 is formed between two adjacent ones of the microstructure members 22 that are arranged in a spaced-apart manner in each of the side regions 202. A width (Wm) of the planar stripes 212 at cross-sectional view is increased in the density-decreasing direction of the microstructure members 22 in each of the side regions 202. That is to say, the width (Wm) of the planar stripes 212 is increased in a direction away from the reference line (L).

In the embodiment, the central region 201 is free of the planar stripes 212.

Each of the microstructure members 22 may have one of a triangular cross section, a semicircular cross section, and a trapezoid cross section. In this embodiment, the microstructure members 22 are exemplified to have a triangular cross section.

Each of the microstructure members 22 has a length (Lm) that extends along the reference line (L) and that is the same as a length of the sheet body 21 extending along the reference line (L).

Figure 5:
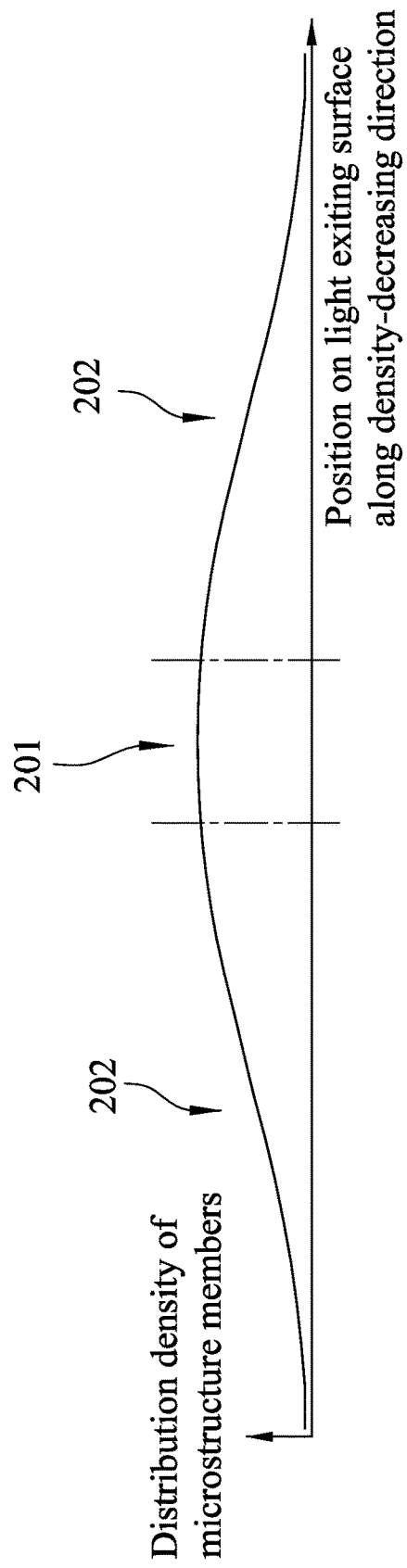
FIG. 5 is a plot showing a distribution density of microstructure members of the embodiment of FIG. 3.

Further referring to FIG. 5, the distribution density profile of the microstructure members 22 in position on the light exiting surface 211 along the density-decreasing direction is shown. It further illustrates that the distribution density of the microstructure members 22 in the central region 201 is greater than that of the side regions 202.

Figure 6:
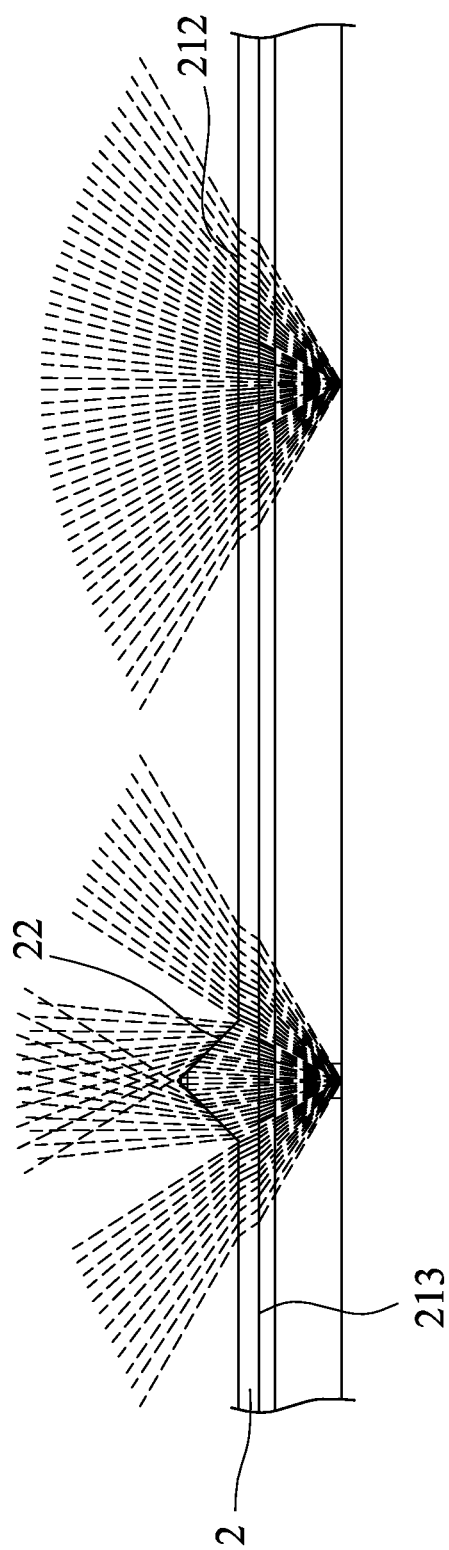
FIG. 6 is a fragmentary schematic view illustrating light emanating from the embodiment of the prism sheet of FIG. 3.

Referring to FIG. 6, when light enters the prism sheet 2 through the light incident surface 213 followed by emanating from the microstructure members 22, the light is refracted and converged toward the center of the microstructure members 22. Due to the difference between the central region 201 and the side regions 202 in the distribution density of the microstructure members 22, the refraction and convergence effect caused by the microstructure members 22 in the central region 201 is more significant than that in the side regions 202.

Figure 7:
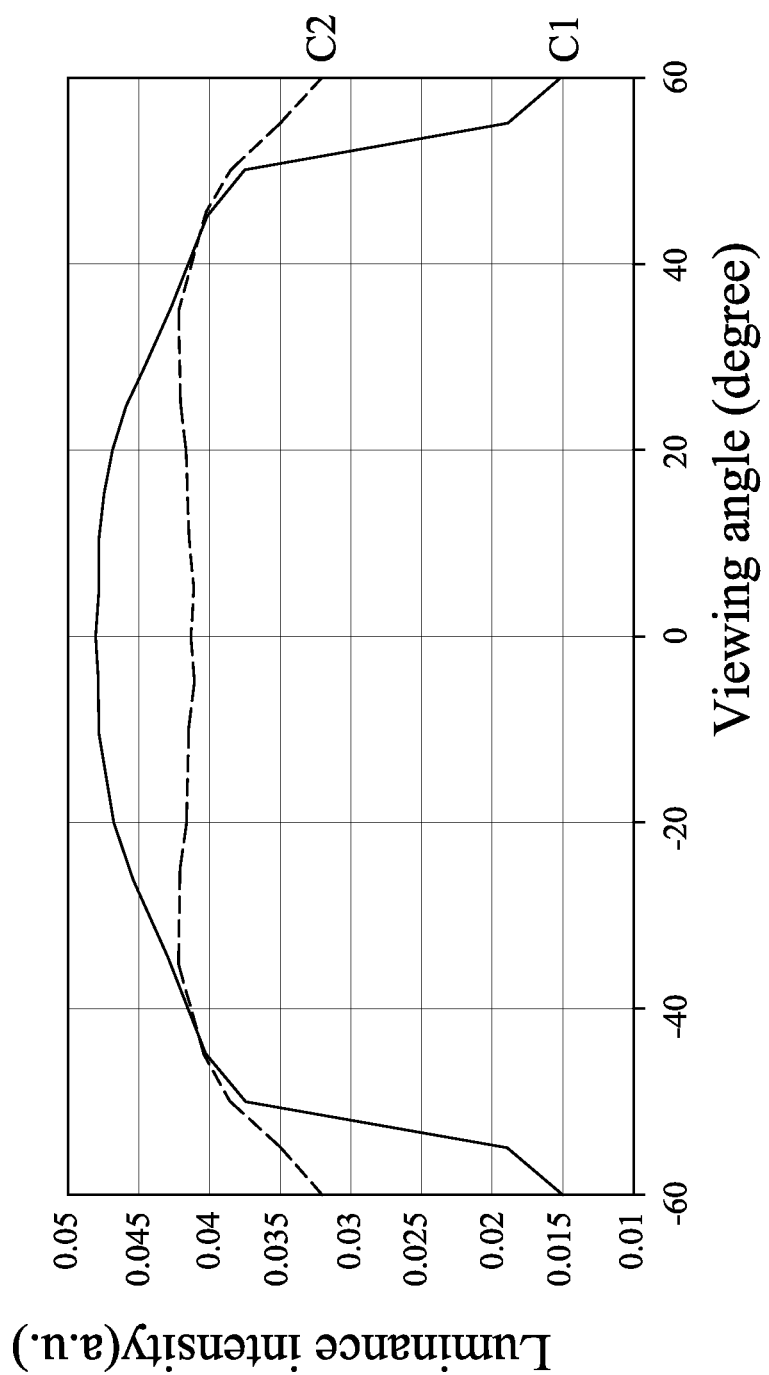
FIG. 7 is a plot showing a light field distribution of light emanating from the embodiment of FIG. 3.

Referring to FIG. 7, a luminous intensity of the central region 201 and a luminous intensity of the side regions 202 are illustrated. The luminous intensities of the central and side regions 201, 202 are determined at various viewing angles with respect to the light exiting surface 211 and represented by an arbitrary unit (a.u.).

In the plot of FIG. 7, a curve C1 represents the luminous intensity of the central region 201, and a curve C2 represents the luminous intensity of one of the side regions 202. As shown by the curve C1, in the central region 201, since the distribution density of the microstructure members 22 in the central region 201 is relatively high, the light refracted by the microstructure members 22 is effectively refracted and converged toward a normal direction relative to the light exiting surface 211 at the viewing angle ranging from −40° to 40°, and thus, the light field distribution of the center view area is changed to enhance luminance of the center view area. In the embodiment, the central region 201 is free of planar stripe 212 which causes light divergence effect and thus this luminance enhancement effect on the central region 201 is more significant when the microstructure members 22 are directly connected with each other. On the other hand, since the distribution density of the microstructure members 22 in the side regions 201 is decreased in the density-decreasing direction and since the planar stripes 212 are present in the side regions 202 in a manner to be increased in the density-decreasing direction of the microstructure members 22, the luminous intensity of the side regions 202 is lower than that of the central region 201 in the center view area. Besides, the prism sheet 2 has a refractive index larger than that of air, and thus, the prism sheet 2 is an optically denser medium and the air is relatively an optically thinner medium. When the light exits from the prism sheet 2 of the optically denser medium and enters the air of the optically thinner medium through an interface between the planar stripes 212 of the prism sheet 2 and the air, the light will diverge. Thus, the light exiting from the planar stripes 212 will have a light exiting angle larger than that of incident light and will diverge away from the center line (L). Therefore, the light field distribution of a tilting view area at the viewing angle smaller than −40° and larger than 40° is maintained, i.e., the luminous intensity of the side regions 202 is maintained to an extent that broad viewing angles with respect to the light exiting surface 211 are maintained.

Accordingly, with the structural arrangement of the microstructure members 22 in the central region 201 and the side regions 202, the luminance of the prism sheet 2 can be enhanced without sacrificing the breadth of the viewing angles.

Therefore, a balance between the viewing angle and the luminance of the prism sheet 2 is improved.

Figure 8:
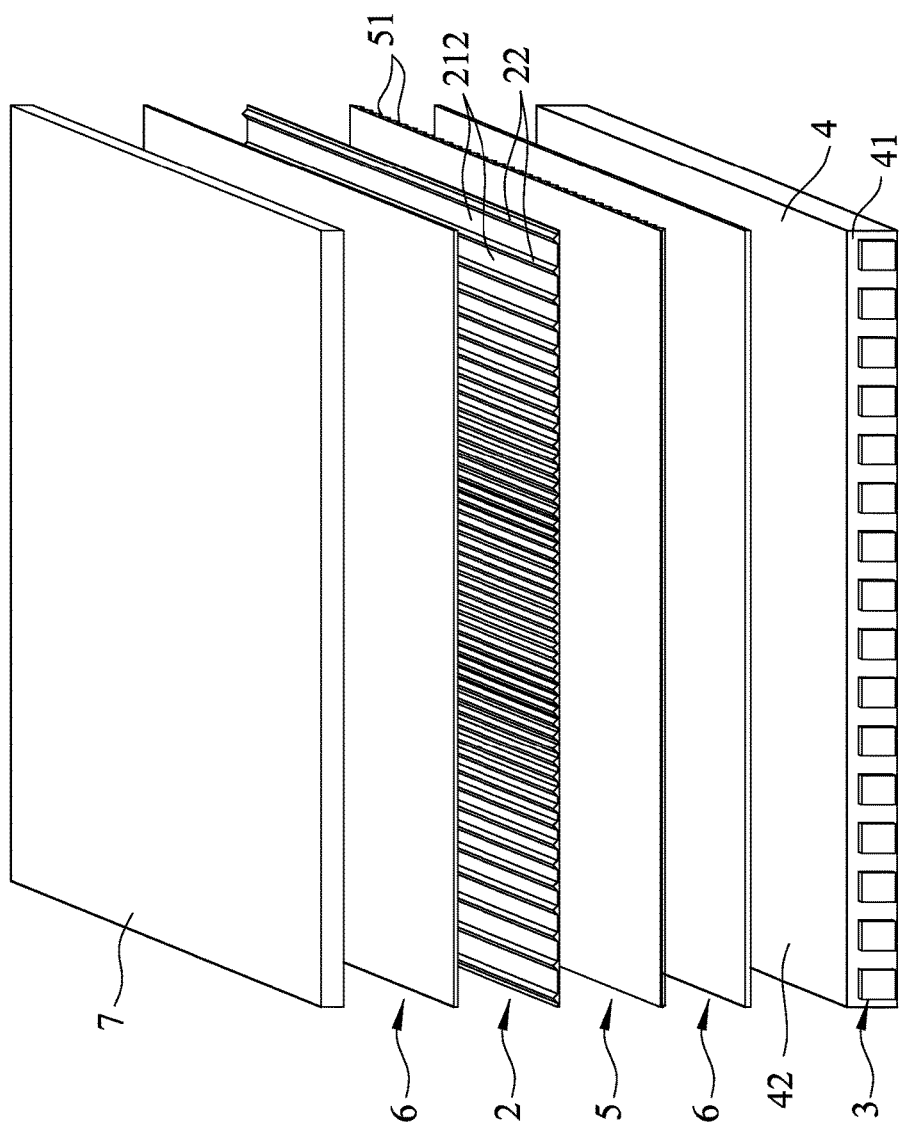
FIG. 8 is an exploded perspective view illustrating an embodiment of a display apparatus according to the disclosure.

Referring to FIG. 8, an embodiment of a backlight module includes a light guide plate 4 having a first surface 41 and a second surface 42 transversely connected to the first surface 41, a light source 3 mounted adjacent the first surface 41, the aforementioned prism sheet 2, an additional prism sheet 5, and two diffusers 6.

The light source 3 is mounted adjacent the first surface 41 of the light guide plate 4 and emanates light that enters the light guide plate 4 through the first surface 41 and exits from the light guide plate 2 through the second surface 42.

The prism sheet 2 is disposed on the second surface 42 of the light guide plate 4 with the light exiting surface 211 facing oppositely of the second surface 42 of the light guide plate 4 and with the lateral side parallel to the first surface 41 so that the microstructure members 22 are perpendicular to the first surface 41 of the light guide plate 4.

The additional prism sheet 5 is disposed between the prism sheet 2 and the light guide plate 4 and includes a plurality of microstructure members 51 that separately protrude, in parallel, from a light incident surface 52 facing the light guide plate 4 and extend parallel to the first surface 41 of the light guide plate 4. Thus, the microstructure members 52 of the additional prism sheet 5 are parallel to the lateral side 214 of the prism sheet 2, i.e., the microstructure members 52 of the additional prism sheet 5 are perpendicular to the microstructure members 22 of the prism sheet 2. Preferably, the microstructure members 51 of the additional prism sheet 5 are directly connected with each other.

One of the diffusers 6 is disposed between the additional prism sheet 5 and the light guide plate 4, and the other one of the diffusers 6 is disposed on the light exiting surface 211 of the prism sheet 2.

Figure 9A:
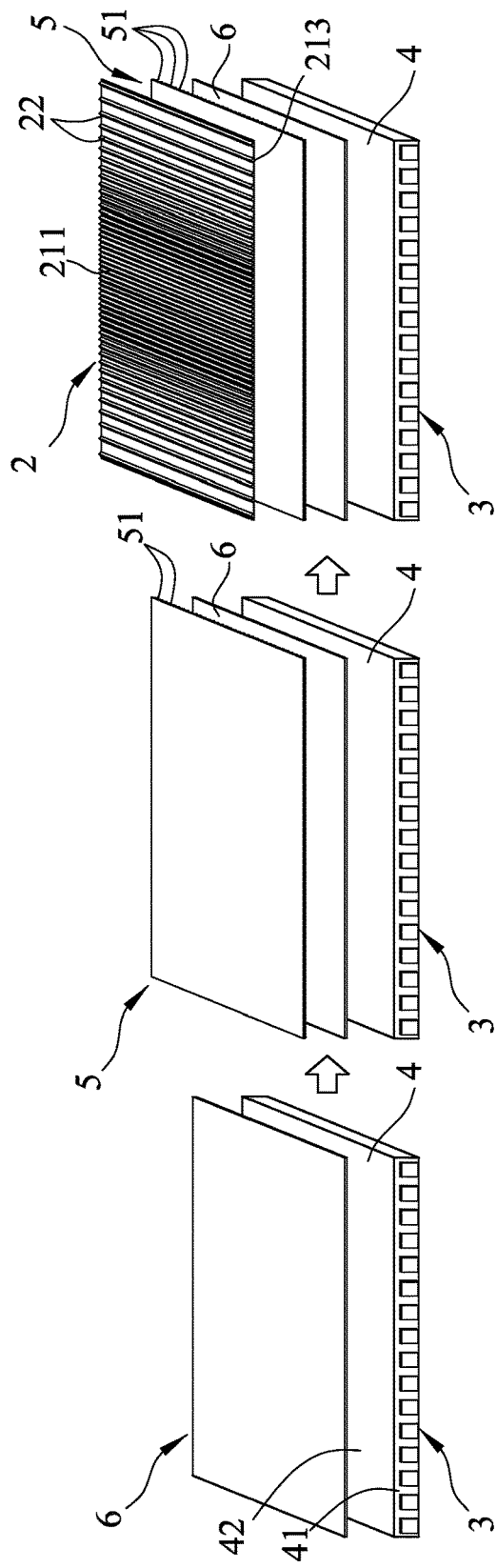
FIGS. 9A-9C including different sub-combinations of the backlight module of FIG. 8 and luminous intensity plots thereof, illustrates how the embodiment of the prism sheet of FIG. 3 improves luminous intensity of the backlight module including the same.
Figure 9B:
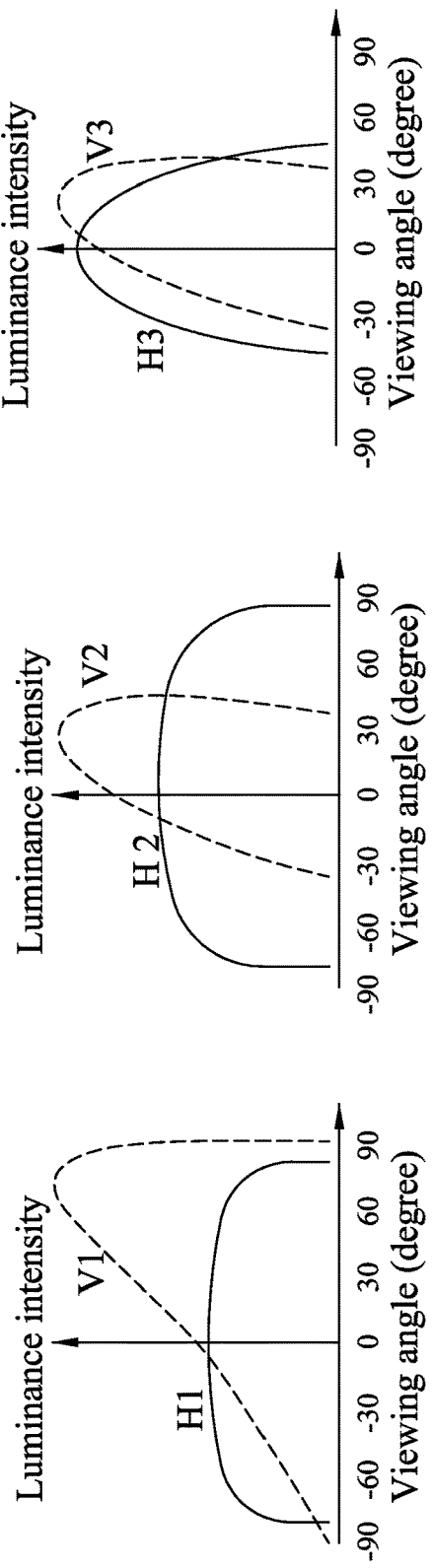
Figure 9C:
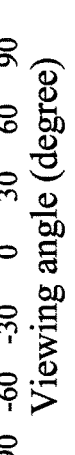

Referring to FIGS. 9A-9C in combination with FIG. 8, changes in luminous intensities of the backlight module along with disposition of the diffuser 6, the additional prism sheet 5 and the prism sheet 2 in that order on the light guide plate 4 are illustrated. The curves V1 to V3 stand for luminous intensities measured at different viewing angles along a direction perpendicular to the first surface 41 of the light guide plate 4. The curves H1 to H3 represent luminous intensities measured at different viewing angles along a direction parallel to the first surface 41 of the light guide plate 4. In FIG. 9A, as shown by the curve V1, when the light emanating from the light source 3 enters the light guide plate 4 through the first surface 41 and is guided to exit from the second surface 42 and to pass through the diffuser 6, the luminous intensity in a position at the viewing angle of −90° is higher than that in a position at the viewing angle of 90°. While as shown by the curve H1, the luminous intensity is uniformly distributed along the direction parallel to the first surface 41 of the light guide plate 4. In FIG. 9B, as shown by the curves V2 and H2, after disposition of the additional prism sheet 5, the light emanating from the diffuser 6 will be refracted and converged toward the normal direction relative to the top surface of the additional prism plate 5. Thus, the light field distribution as formed is converged toward the center view area. Uniform distribution of the luminous intensity along the direction parallel to the first surface 41 of the light guide plate 4 is maintained. In FIG. 9C, as shown by the curves V3 and H3, after disposition of the prism sheet 2 on the additional prism sheet 5 opposite to the diffuser 6, the light emitting from the prism sheet 2 is refracted and converged toward the normal direction relative to the light exiting surface 211 of the prism sheet 2 both in directions parallel to and perpendicular to the first surface 41.

Figure 10:
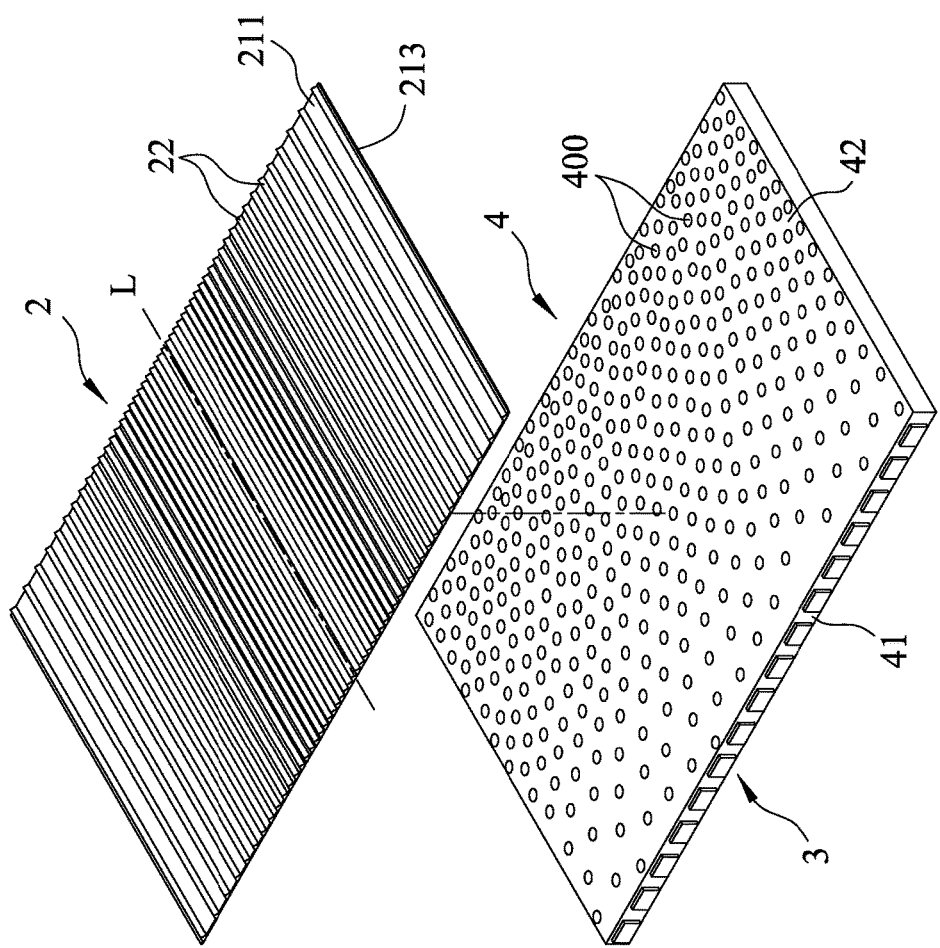
FIG. 10 is an exploded view illustrating a combination of the embodiment of the prism sheet of FIG. 3 and a light guide plate.
Figure 11:
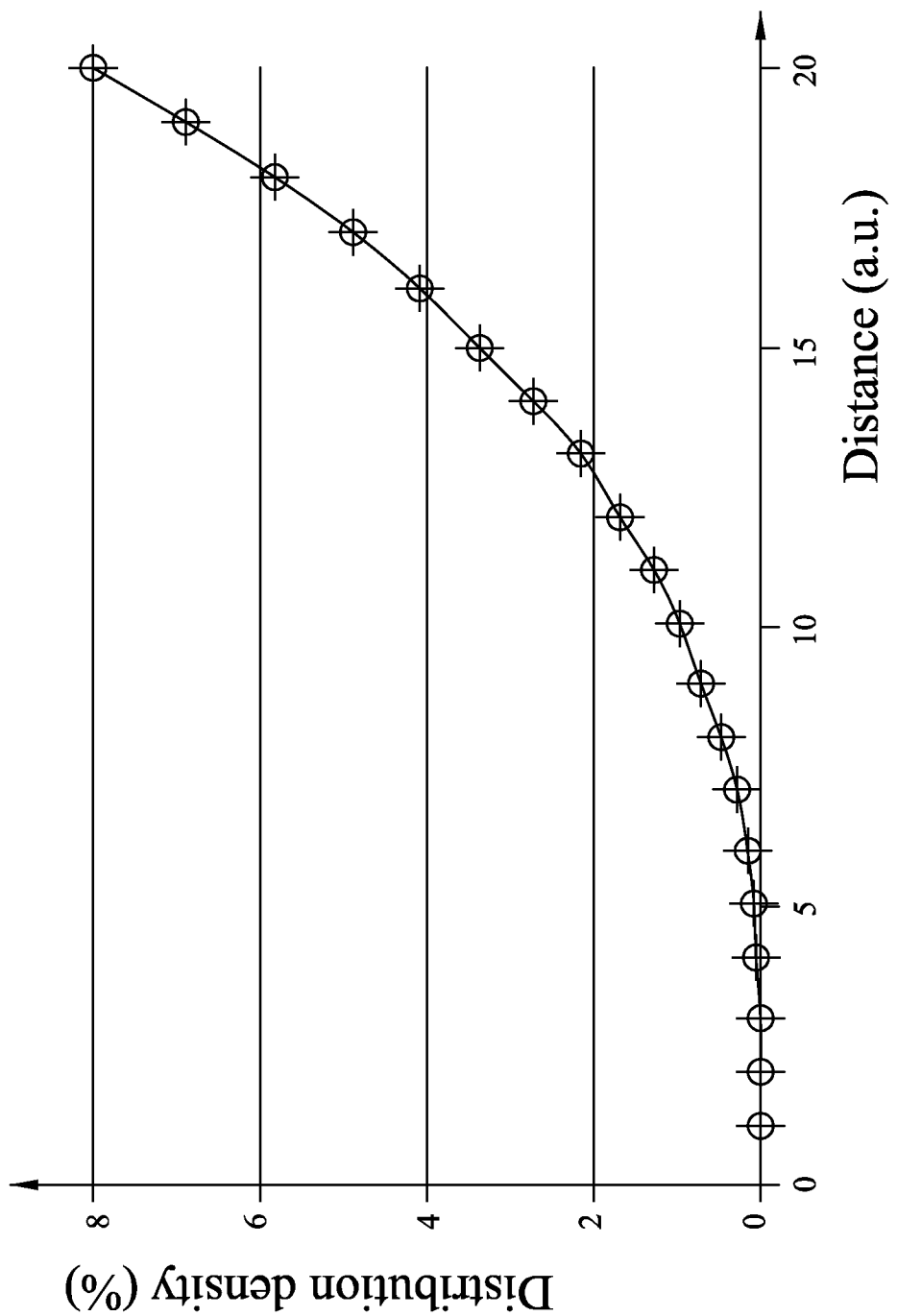
FIG. 11 is a plot showing a distribution density of light-guiding microstructure members of the light guide plate.

Referring to FIGS. 10 and 11, in the embodiment, the first surface 41 of the light guide plate 4 is formed with a plurality of light-guiding microstructure members 400 that are gradually increased in a direction away from the light source 3 and parallel to the reference line (L). In FIG. 11, the X-axis represents a distance away from the light source 3 in the direction parallel to the reference line (L) expressed in an arbitrary unit (a.u.), and the Y-axis represents a distribution density of the light-guiding microstructure members 400 expressed as a percentage. The distribution density of the light-guiding microstructure members 400 is increased in the direction away from the light source 3 and parallel to the reference line (L). When the light enters the light guide plate 4 through the first surface 41 and exits from the second surface 42 of the light guide plate 4 through the light-guiding microstructure members 400, the light will tend to emanate toward the prism sheet 2 by passing through the light-guiding microstructure members 400. In the embodiment, with the distribution density of the light-guiding microstructure members 400 increased away from the light source 3, the light exiting from the second surface 42 of the light guide plate 4 has a relatively great tendency to emit toward the prism sheet 2 so as to avoid the light emitted from the second surface 42 of the light guide plate 4 being concentrated at a position close to the light source 3, and so as to ensure even distribution of the light emitted from the second surface 42 of the light guide plate 4.

In the embodiment, the light-guiding microstructure members 400 are micro lenses like as dots of semi-sphere or other shapes, or cuts of V-shape, arc-shape or other shapes.

Figure 12:
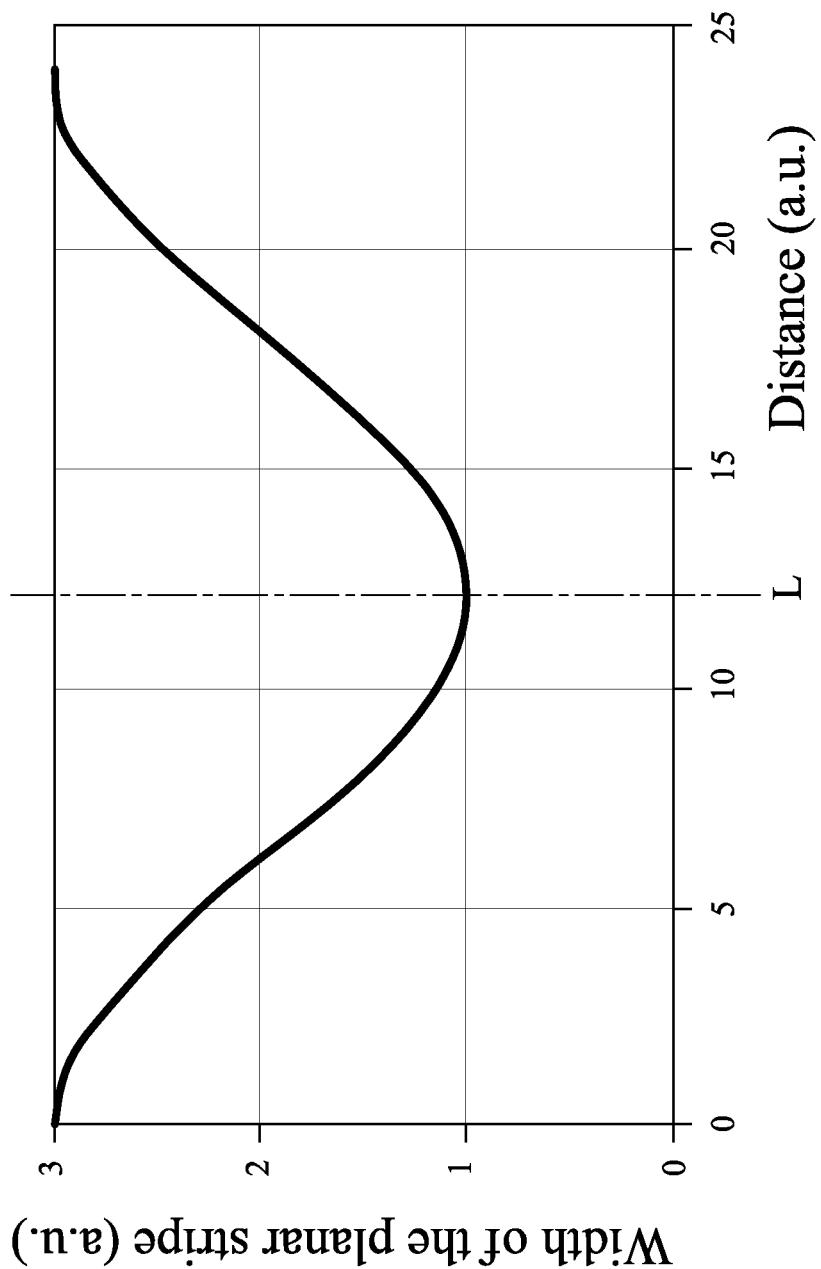
FIG. 12 is a plot showing a change in a width of planar stripes of the microstructure members of another embodiment of the prism sheet.

Referring to FIG. 12, in another embodiment, the central region 201 is formed with the planner stripes 212, instead of the central region 201 free of the planner stripes 212 as shown in FIG. 4. The X-axis of the plot of FIG. 12 represents a distance in the direction perpendicular to the reference line (L) in an arbitrary unit (a.u.), and the Y-axis represents the width of the planar stripes 212 of the side regions 202 of the prism plate 2 in an arbitrary unit (a.u.). Since the distribution density of the microstructure members 22 in the central region 201 is greater than that of the side regions 202, and since the distribution density of the microstructure members 22 is decreased in the density-decreasing direction (D) and away from said reference line (L), the width (Wm) of the planar stripes 212 is increased in the density-decreasing direction (D) of the microstructure members 22 in each of the side regions 202 and away from the reference line (L). By virtue of arrangement of the planar stripes 212 and the microstructure members 22 of the prism sheet 2, the prism sheet 2 of the disclosure exhibits a light field with the maintained luminance in the central region 201 and the broadened breadth of the viewing angles in the side regions 202.

Referring back to FIG. 8, an embodiment of the display apparatus includes the aforementioned backlight module, and a display panel 7. The display panel 7 is disposed at one side of the prism sheet 2 opposite to the light guide plate 4. The light emitting from the backlight module enters the display panel 7 so as to display an image. More specifically, the display panel 7 is disposed on the diffuser 6 that is disposed on the prism sheet 2 and opposite to the additional prism sheet 5.

In the embodiment, when a user views the display apparatus of the disclosure, the user will face the display panel 7 in a position that the microstructure members 22 of the prism sheet 2 extend in an up-to-down direction, that the microstructure members 51 of the additional prism sheet 5 extend in a left-to-right direction and that the light source 3 is located at the bottom of the display apparatus. The breadth of the viewing angles of the display apparatus is concerned primarily in the left-to-right direction, and is less concerned in the up-to-down direction. For the display apparatus, the luminance of the display apparatus in the left-to-right direction can be increased by refracting and converging the light toward the normal direction relative to the light exiting surface 211 of the prism sheet 2 by the microstructure members 22 of the central region 201 of the prism sheet 2 and the breadth of the viewing angles of the display apparatus in the left-to-right direction can be maintained by the microstructure members 22 and the planar stripes 212 of the side regions 202 of the prism sheet 2. In addition, the luminance of the display apparatus in the up-to-down direction can be increased by the microstructure members 51 of the additional prism sheet 5. Hence, the display apparatus of the disclosure is suitable for entertainment application, e.g. a television or a video wall including a television set.

In summary, by virtue of the design of the microstructure members 22 and the planar stripes 212 of the prism sheet 2, the luminance of the backlight module can be increased by refracting and converging the light toward the normal direction relative to the light exiting surface 211 of the prism sheet 2 in the central region 201, and the breadth of the viewing angle of the backlight module can be maintained in the side regions 202, so that the display panel 7 coupled to the backlight module can have an improved display effect.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A prism sheet, comprising:
   a sheet body including a light exiting surface, a light incident surface opposite to said light exiting surface, and a lateral side transversely connected between said light incident and exiting surfaces, said light exiting surface including two side regions disposed on two opposite sides of a reference line on said light exiting surface, which is perpendicular to said lateral side; said sheet body further including a plurality of parallel microstructure members protruding from said light exiting surface and extending perpendicularly to said lateral side;
   wherein said microstructure members have a distribution density which is decreased in a density-decreasing direction that is parallel to said lateral side and that points toward either of said side regions from said reference line.

2. The prism sheet of claim 1, wherein said light exiting surface further includes a central region having the reference line and interposed between said side regions, the distribution density of said microstructure members being decreased in each of said side regions from said central region and along the density-decreasing direction, the density-decreasing direction of said microstructure members in each of said side regions being parallel to said lateral side and opposite to that of said microstructure members in the other one of said side regions.

3. The prism sheet of claim 2, wherein said microstructure members are directly connected with each other in said central region.

4. The prism sheet of claim 1, wherein said light exiting surface further includes multiple planar stripes each formed between two adjacent ones of said microstructure members that are arranged in a spaced-apart manner in each of said side regions, a width of said planar stripes being increased in the density-decreasing direction of said microstructure members in each of said side regions, said central region being free of said planar stripes.

5. The prism sheet of claim 1, wherein each of said microstructure members has one of a triangular cross section, a semicircular cross section, and a trapezoid cross section.

6. The prism sheet of claim 1, wherein the reference line passes through a center of said light exiting surface.

7. The prism sheet of claim 1, wherein each of said microstructure members has a length that extends along the reference line and that is the same as a length of said sheet body extending along the reference line.

8. The prism sheet of claim 1, wherein said light exiting surface further includes a central region interposed between said side regions, said microstructure members in said central region having a distribution density greater than that of said microstructure members in said side regions.

9. A backlight module, comprising:
   a light guide plate having a first surface and a second surface transversely connected to said first surface;
   a light source mounted adjacent said first surface of said light guide plate and emanating light that enters said light guide plate through said first surface and exits from said light guide plate through said second surface; and
   a prism sheet of claim 1 disposed on said second surface of said light guide plate with said light exiting surface facing oppositely of said second surface of said light guide plate.

10. The backlight module of claim 9, wherein said lateral side of said prism sheet is parallel to said first surface of said light guide plate, said microstructure members being perpendicular to said first surface of said light guide plate.

11. The backlight module of claim 9, wherein said light exiting surface further includes a central region having the reference line and interposed between said side regions, the distribution density of said microstructure members being decreased in each of said side regions from said central region and along the density-decreasing direction, the density-decreasing direction of said microstructure members in each of said side regions being parallel to said lateral side and opposite to that of said microstructure members in the other one of said side regions.

12. The backlight module of claim 11, wherein said microstructure members are directly connected with each other in said central region.

13. The backlight module of claim 11, wherein said light exiting surface further includes multiple planar stripes each formed between two adjacent ones of said microstructure members arranged in a spaced-apart manner in each of said side regions, a width of said planar stripes being increased along the density-decreasing direction of said microstructure members in each of said side regions.

14. The backlight module of claim 9, wherein each of said microstructure members has one of a triangular cross section, a semicircular cross section, and a trapezoid cross section.

15. The backlight module of claim 9, wherein the reference line passes through a center of the light exiting surface.

16. The backlight module of claim 9, wherein each of said microstructure members has a length that extends along the reference line and that is the same as a length of said sheet body extending along the reference line.

17. The backlight module of claim 9, wherein said light exiting surface further includes a central region interposed between said side regions, said microstructure members in said central region having a distribution density greater than that of said microstructure members in said side regions.

18. The backlight module of claim 9, wherein said light guide plate is formed with a plurality of light-guiding microstructure members that are gradually increased in a direction that is parallel to the reference line and that is away from said light source.

19. A display apparatus, comprising
a backlight module as claimed in claim 9; and
a display panel disposed at one side of said backlight module opposite to said light guide plate.

* * * * *